United States Patent [19]

Roderique et al.

[11] Patent Number: 5,841,764
[45] Date of Patent: Nov. 24, 1998

[54] METHOD AND APPARATUS FOR PERMITTING A RADIO TO ORIGINATE AND RECEIVE DATA MESSAGES IN A DATA COMMUNICATIONS NETWORK

[75] Inventors: William J. Roderique, Lynchburg; Philip M. Hoge, Forest; George M. Autry, IV, Lynchburg, all of Va.

[73] Assignee: Ericsson Inc., Research Triangle Park, N.C.

[21] Appl. No.: 550,397

[22] Filed: Oct. 30, 1995

[51] Int. Cl.⁶ .................................................. H04L 12/66
[52] U.S. Cl. .................... 370/310; 370/401; 370/467; 370/469; 370/471
[58] Field of Search ........................... 370/310, 311, 370/312, 313, 314, 315, 316, 332, 333, 317, 318, 319, 320, 321, 322, 323, 324, 325, 326, 327, 328, 329, 330, 331, 334, 335, 336, 337, 338, 343, 344, 345, 347, 349, 400, 401, 402, 403, 404, 405, 466, 467, 469, 474, 475, 476, 473, 470, 471; 455/422, 426, 450, 507, 517, 524, 560, 100, 113, 114, 115, 117

[56] References Cited

U.S. PATENT DOCUMENTS 5,144,622  9/1992  Takiyasu et al. .
5,293,379  3/1994  Carr .
5,307,413  4/1994  Denzer .
5,371,734  12/1994  Fischer .
5,446,736  8/1995  Gleeson et al. .
5,448,569  9/1995  Huang et al. .

FOREIGN PATENT DOCUMENTS 0 578 041 A  1/1994  European Pat. Off. .
93/19544 A   9/1993  WIPO .
95/10150 A   4/1995  WIPO .

Primary Examiner—Huy D. Vu
Attorney, Agent, or Firm—Nixon & Vanderhye P.C.

[57] ABSTRACT

In a packet-based communications system where each packet includes a header and an associated data portion, message packets are communicated between entities on a radio communications network through a data gateway. The other network uses a standard internetwork protocol (IP). Predetermined fields in the standard (IP) header of each message packet are eliminated to obtain a modified radio network layer header before transmitting message packets over the radio network. Conversely, one or more predetermined fields are added to the modified header to convert that modified header into a corresponding standard IP header before transmission over the other network. Short and long versions of the modified radio network layer header are used with the short header version being used by radios to support network layer communications with minimal impact to the radios. Enough information is preserved in the reduced IP network header so that the standard IP header may be reassembled/reconstructed.

16 Claims, 10 Drawing Sheets

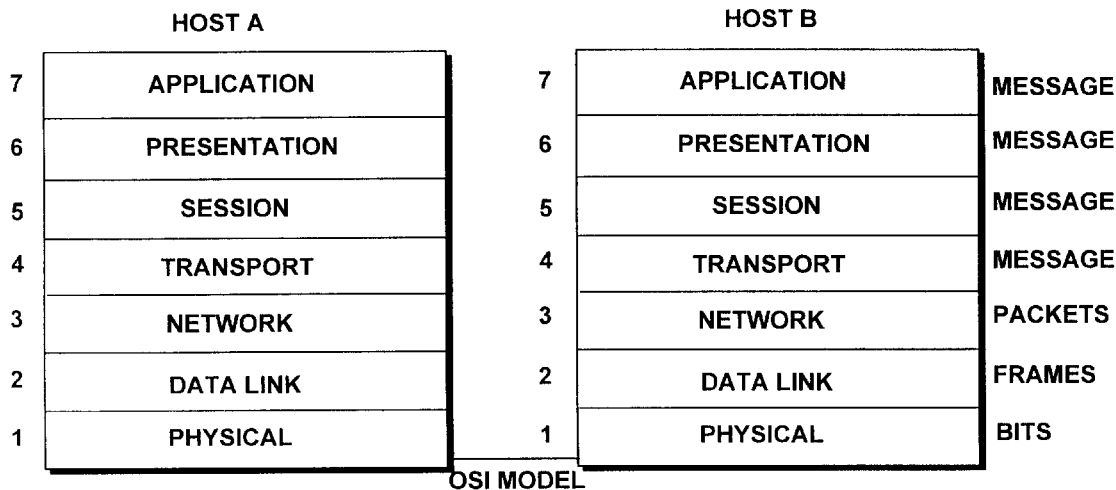
Fig. 1A Prior Art
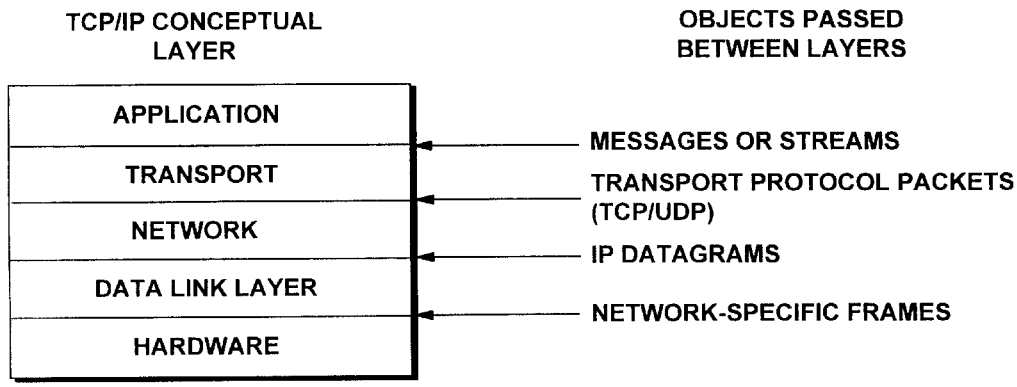
Fig. 1B Prior Art
Fig. 2A Prior Art
STANDARD INTERNET PROTOCOL (IP) DATAGRAM
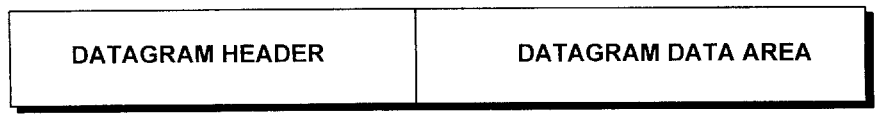

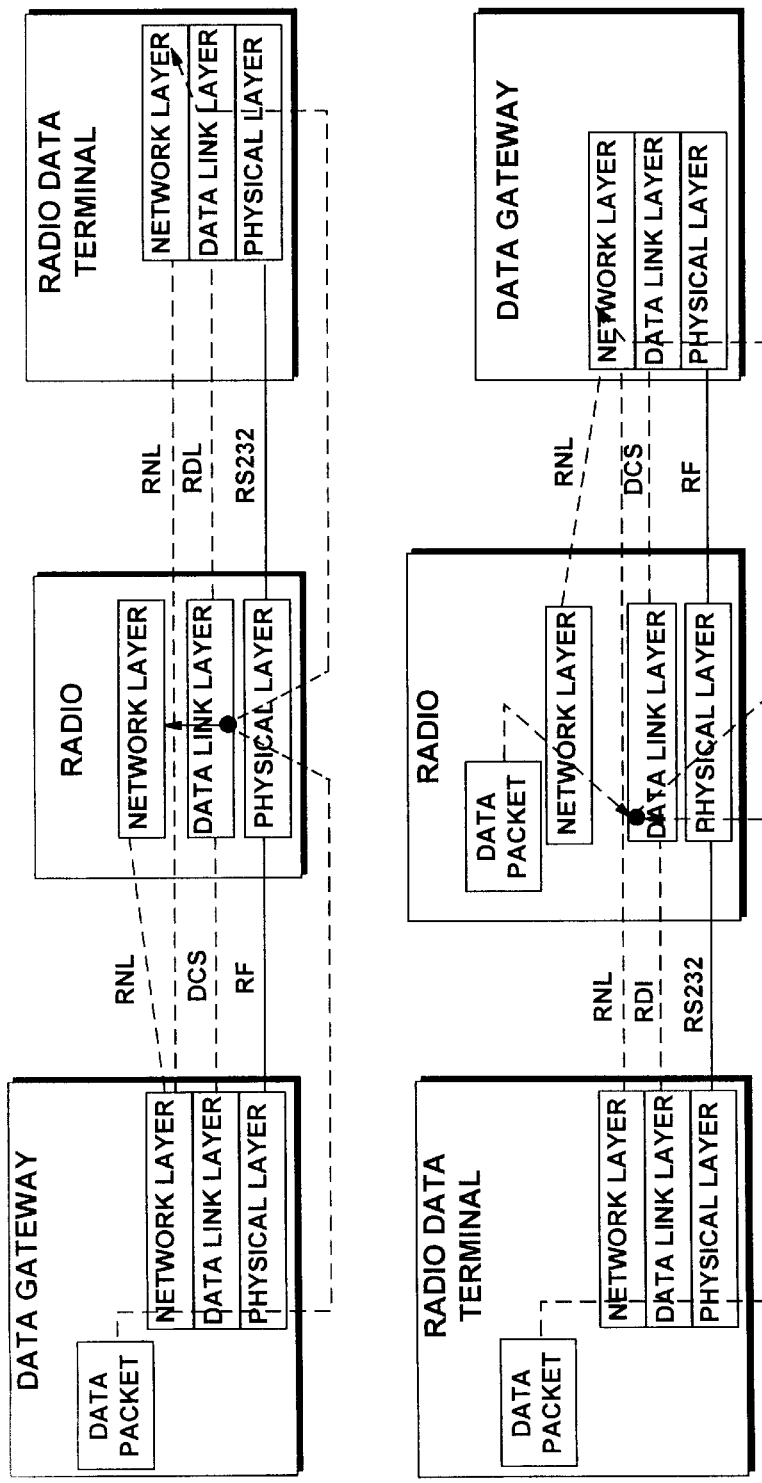

| VERSION | UNUSED BITS | RNLH SIZE | EXTENDED ADDRESS | TRANSPORT LAYER PROTOCOL | ID | MF | FRAGMENT OFFSET |

*Fig. 5A*

LONG RADIO NETWORK LAYER HEADER

| VERSION | UNUSED BITS | RNLH SIZE | EXTENDED ADDRESS | TRANSPORT LAYER PROTOCOL |

SHORT RADIO NETWORK LAYER HEADER

*Fig. 5B*

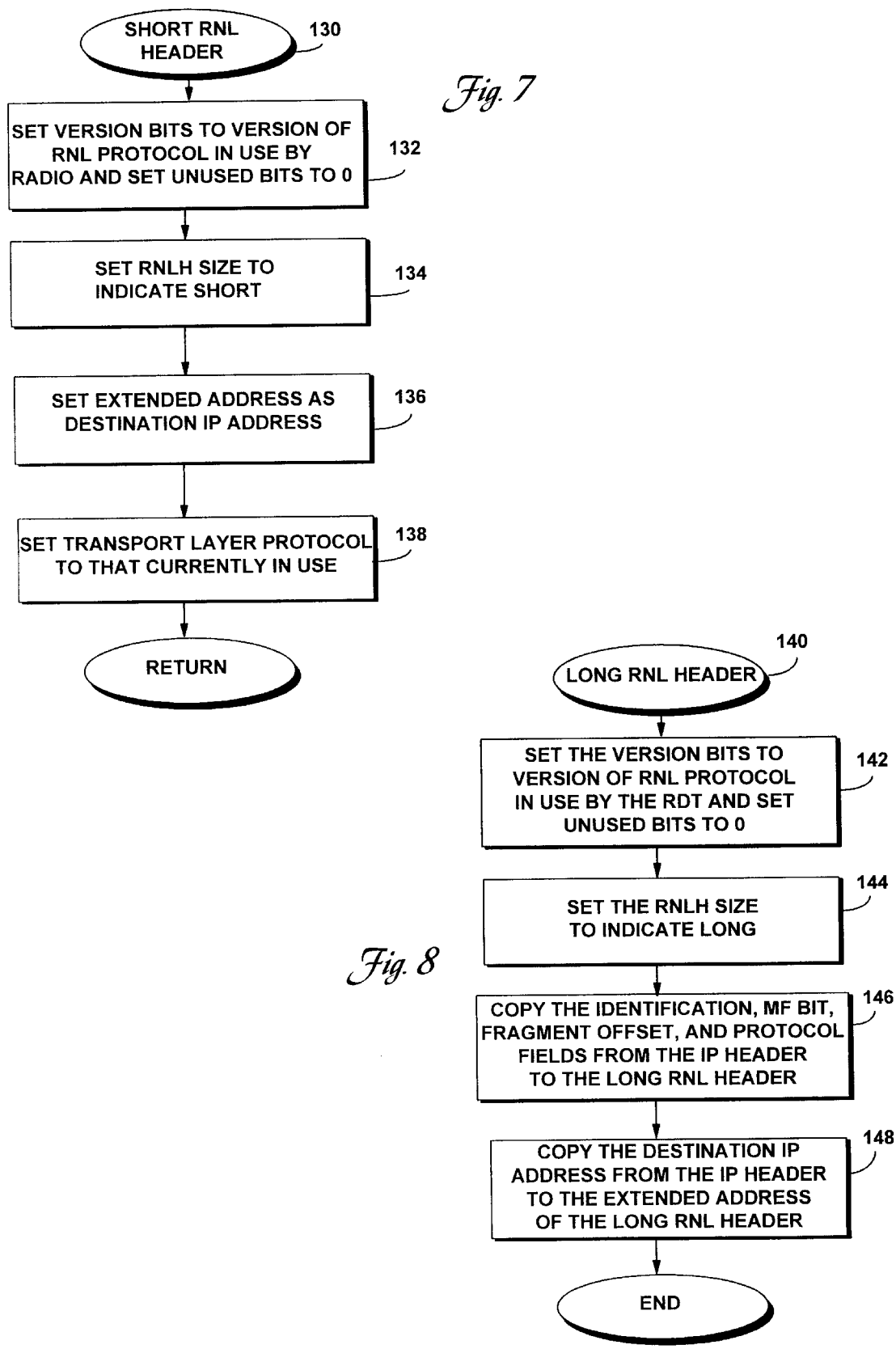

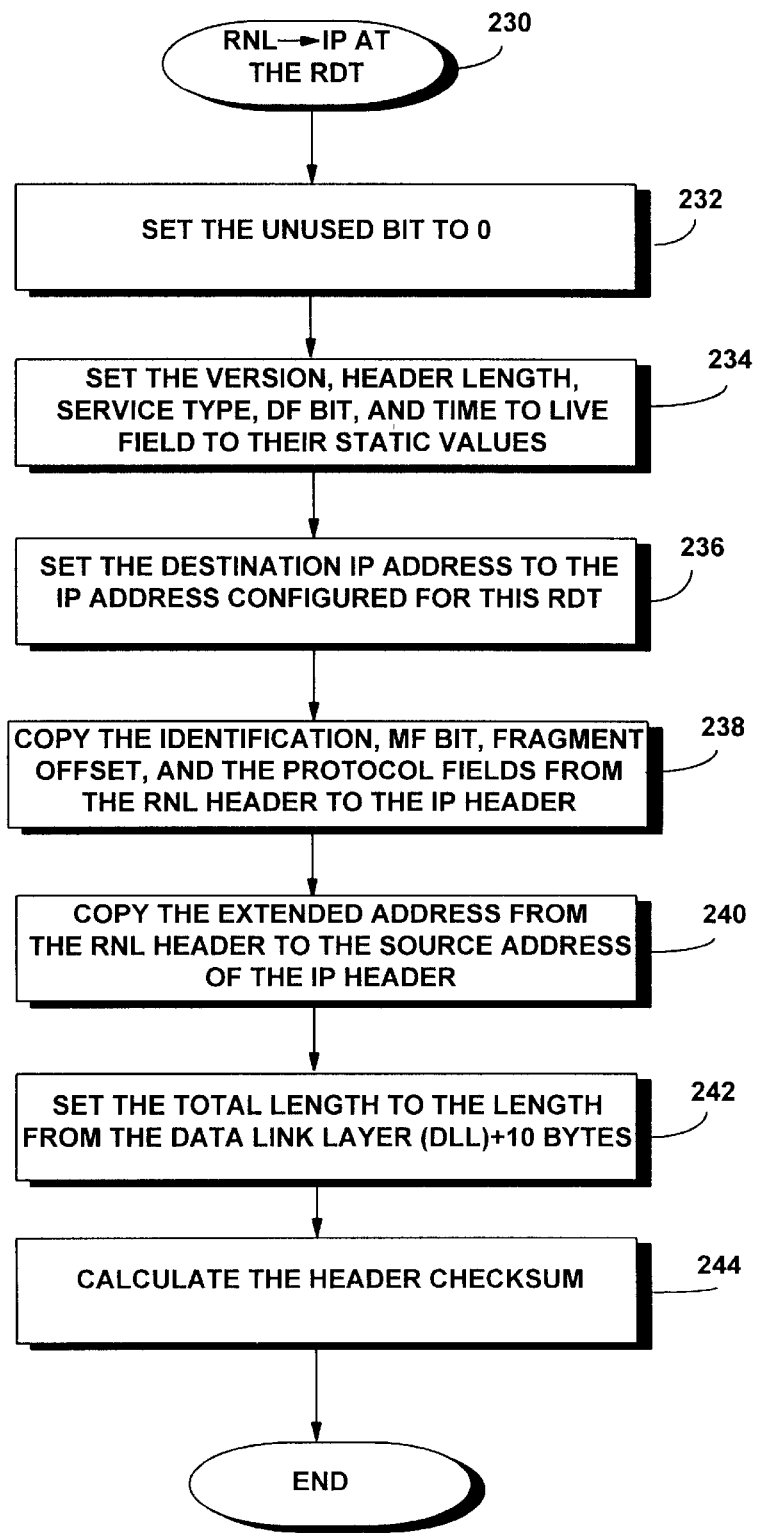

METHOD AND APPARATUS FOR PERMITTING A RADIO TO ORIGINATE AND RECEIVE DATA MESSAGES IN A DATA COMMUNICATIONS NETWORK

RELATED U.S. APPLICATIONS

This application is related to U.S. patent application Ser. No. 08/514,736 entitled "Method and Apparatus for Modifying a Standard Internetwork Protocol Layer Header" which is assigned to the assignee of the present invention and incorporated herein by reference.

FIELD OF THE INVENTION

The present invention relates to the transmission of data packets over a data communications network that includes a radio link, and more particularly, to a communications protocol which permits radios in the data communications network to originate and receive data messages.

BACKGROUND AND SUMMARY OF THE INVENTION

The open systems interconnection (OSI) model divides the communications process into the seven layers illustrated in FIG. 1(a). Certain communications tasks are assigned to certain layers and the output of each layer has a precise format established for it. Data from an application or process running on a first host computer A passes through each OSI layer on its way to communications network. As the information descends through each layer, it undergoes a transformation that prepares it for processing by the next layer. Upon reaching the bottom layer, data is tasked to the physical medium of the network as a serial stream of bits represented by a changing signal, i.e., changing volts, radio frequency waves, or light pulses. After receiving the changing signal at a second host computer (host B), the stream travels in reverse order through the seven OSI layers.

Layer protocols and interfaces therebetween are defined which provide specifications for communication between a process or program being executed on one host computer's operating system and another process or program running on another computer. Transmission control protocol/internet protocol (TCP/IP) are two protocols that are part of a protocol suite or family of protocols layered and designed to connect computer systems that use different operating systems and network technologies. FIG. 1(b) illustrates conceptual layers for TCP/IP somewhat analogous to the OSI model of FIG. 1(a) as well as the format of objects passed between adjacent protocol layers.

TCP/IP is a four layer protocol suite (the hardware layer is not counted) which facilitates the interconnection of two or more computer systems on the same or different networks, and in certain networks such as the Internet, is a requirement for interoperability. The four layers comprise two independent protocols: TCP, which can be used to access applications on other systems within a single network, and IP, which permits identification of source and destination addresses for communication between systems on different networks. The present invention relates generally to the latter IP protocol.

At the internet layer, the internet protocol permits identification of source and destination addresses for communication over physical networks. The fundamental internetwork service consists of a packet delivery system, and the internetwork protocol (IP) defines that delivery mechanism, i.e., the basic unit of data transfer. Thus, the IP specifies the exact format of all data as it passes across a TCP/IP internet. The IP software also performs a routing function by choosing a path over which data will be sent.

The basic data transfer unit is often called a "datagram" (similar to a typical physical network "frame") and is divided into header and data areas. A datagram is shown in FIG. 2(a). The header contains (1) source and destination addresses and (2) a type field that identifies the contents of the datagram. The IP protocol only specifies the header format including the source and destination IP addresses; it does not specify the format of the data area.

FIG. 2(b) shows a standard IP header consisting of a number of predefined fields. The first four bit field VERS contains the version of the IP protocol that was used to create the datagram. The VERS field is used to verify that the sender, receiver, and any gateways in between, agree on the format of the datagram. The four bit header length field HLEN provides the datagram header length measured in multiples of thirty-two bit words. The TOTAL LENGTH field gives the length of the IP datagram (both header and data) measured in octets. By subtracting the length of the header from the total length found in the TOTAL LENGTH field, the size of the data area can be calculated. The eight bit SERVICE type field specifies how the datagram should be handled.

The three fields—IDENTIFICATION, FLAGS, and FRAGMENT OFFSET—control fragmentation and reassembly of datagrams. Since an IP datagram may not fit into one physical frame data area, (a constraint of the physical network), the datagram may be divided into smaller pieces called "fragments" with the process of dividing a datagram being known as "fragmentation." Fragment size is chosen so that each fragment can be shipped across the underlying network in a single frame. Each fragment has the same format as the original datagram. Accordingly, each fragment contains a header that duplicates most of the original datagram header except for a bit in the FLAGS field. The FLAGS bit identifies the datagram as a fragment which carries a data amount up to a total length that is smaller than the maximum transfer unit permitted over the network. Once a datagram is fragmented, the fragments travel as separate datagrams all the way to the ultimate destination where they must be reassembled. The field IDENTIFICATION contains a unique integer that identifies the datagram to allow the destination to know which of the arriving fragments belong to which datagrams. As the fragment arrives, the destination uses the IDENTIFICATION field along with the datagram source address to identify the datagram. The FRAGMENT OFFSET specifies the offset in the original datagram of the data being carried in the fragment measured in units of eight octets starting at offset zero. To reassemble the datagram, the destination must obtain all fragments starting with the fragment that has offset "zero" through the fragment with the highest offset. The FLAGS field controls fragmentation with one of the bits being called the "more fragments bit."

The TIME TO LIVE (TTL) field specifies how long in seconds the datagram is allowed to remain in the Internet system and is normally used as a count value so that time does not have to be synchronized across the network. The PROTOCOL field specifies which high level protocol was used to create the message being carried in the data area of the datagram. In essence, the value of the PROTOCOL field specifies the format of the data area. The field HEADER CHECKSUM is formed by treating the header as a sequence of sixteen bit integers, adding them together using one's complement arithmetic, and taking the one's complement of the result. Fields SOURCE IP ADDRESS and DESTINA- TION IP ADDRESS contain the thirty-two bit IP addresses of the datagram sender and intended recipient. Thus, the IP addresses specify the original source and ultimate destination. The IP OPTIONS and PADDING fields are included mainly for testing and debugging of the network.

Since each layer of the OSI and TCP/IP models adds header type information, there is a considerable amount of "overhead" added to the originally transmitted data. There is also the significant processing overhead associated with packetizing data for network and internetwork transmission. Because the network and internetwork packet header is meant to be used across a variety of applications, the standard IP packet header contains fields that may not be used or needed in a particular application. While these extra fields may not be a problem in high bandwidth communication environments, they present a significant problem when used in a radio frequency (RF) communications environment. RF bandwidth is a precious resource in such applications as public safety trunked radio and cellular radio. Any additional overhead bits/fields decreases the amount of actual data that can be sent in the given unit of time therefore lowering data throughput. Thus, one objective of the present invention is to minimize the overhead required to send a packet of data over an RF data communications network but at the same time permit those RF data communications to be compatible with industry accepted internetwork protocol standards like IP and TCP/IP.

A method and apparatus which permit internetworked communications between computers in a radio frequency communications network and computers connected to a wireline network and minimizes protocol overhead while maintaining compatibility with conventional TCP/IP protocols is disclosed in copending, commonly assigned U.S. patent application Ser. No. 08/514,736. Unnecessary IP header bits are removed before packets are transmitted over the radio network to conserve RF channel bandwidth. Knowledge of information already present in the data link layer of the RF channel communications protocol is used to omit unnecessary or redundant fields in the standard IP header of the network layer. Enough information is preserved in the reduced IP network header so that the standard IP header may be reassembled/reconstructed. This reduced IP radio network layer header (RNLH) is commonly referred hereafter as a long RNLH.

In a conventional radio data communications network, the radio acts primarily as a conduit processing specific frames of data at the data link layer between computer terminals. For this reason, the radio usually only supports the data link and physical link layers of the OSI model. Recently, however, it is desirable for the radio to function like any other computing device in a computer network. For example, it is desirable to program or reprogram the "personality" of an individual radio directly over the air without having to hardwire connect the radio to some other programming device. Text messaging with the radio is also a desirable feature for some radios. In addition, multiple "end" computing entities may be associated with a single radio, including for example, a radio data terminal, an automatic vehicle locator device (AVL), a radio group, a radio data terminal group, etc.

Conventionally, the radio is not the final destination for any specific data messages; nor does the radio originate data messages. The present invention "elevates" the radio so that it functions like any other "end computing device" in the network. However, to obtain this elevated status and these benefits, the radio must support the network layer protocol which means that the radio must accept and generate IP datagrams. Thus, to function as an end computing device, the radio "supports" the network layer by (1) processing network layer headers attached to network layer messages (rather than just passing them through as raw data) and (2) generating a compatible network layer header and attaching it to all data message which the radio originates.

While the radio could be extensively reprogrammed the radio and existing radio communications protocols modified for the radio to function at the network layer, the present invention achieves this goal with minimal reprogramming and RF protocol modification. Specifically, the radio attaches a "short" radio network layer header to data messages it originates. The short radio network layer header contains the minimum data necessary for the radio to provide network layer support without having to store data and fill-in IP header fields that are non-essential for the radio's communication, data processing, and networking needs.

In a preferred embodiment of the present invention, the short network layer header includes only the same first several fields of a longer radio network layer header referred to above and described in detail in the above-identified application. The other fields in the long radio network layer header are used for example in data communications with radio data terminals (RDTs) where data messages are transceived over the radio network via radios connected to the RDTs. The short header allows the radios to support messaging at the network layer level with minimum impact on existing radios while at the same time adhering to the well established OSI model for data communications. In addition, the short radio network layer header is "open-ended" so that additional fields may be added to the short radio network layer header to adapt to changing communications needs and accommodate advances in communications protocols.

BRIEF DESCRIPTION OF THE DRAWINGS

These objects and advantages, as well as others will be better understood from the following detailed description taken in conjunction with the accompanying drawings in which:

FIG. 1(a) is a diagrammatic view of an open systems interconnection (OSI) model;

FIG. 1(b) is a diagram of the conceptual layers of the TCP/IP protocol indicating objects which are passed between layers;

FIG. 2(a) is a diagrammatic view of a standard IP datagram;

FIG. 4 is a high level diagram showing potential data communications between the data gateway, a radio, and a radio data terminal (RDT);

FIGS. 5(a) and 5(b) are diagrams showing short and long radio network layer headers in accordance with the present invention;

FIG. 7 is a flowchart diagram illustrating the procedures for generating a short radio network layer header;

FIG. 8 is a flowchart diagram illustrating the procedures for generating a long radio network layer header;

FIG. 12 is a flowchart diagram illustrating the procedures for converting a radio network layer header to an IP header at the radio data terminal.

DETAILED DESCRIPTION OF THE INVENTION

In the following description, for purposes of explanation and not limitation, specific details are set forth such as particular circuits, protocols, techniques, etc. in order to provide a thorough understanding of the present invention. However, it will be apparent to one skilled in the art that the present invention may be practiced in other embodiments that depart from these specific details. In other instances, detailed descriptions of well-known methods, devices, protocols, and circuits are omitted so as not to obscure the description of the present invention with unnecessary detail.

Figure 3:
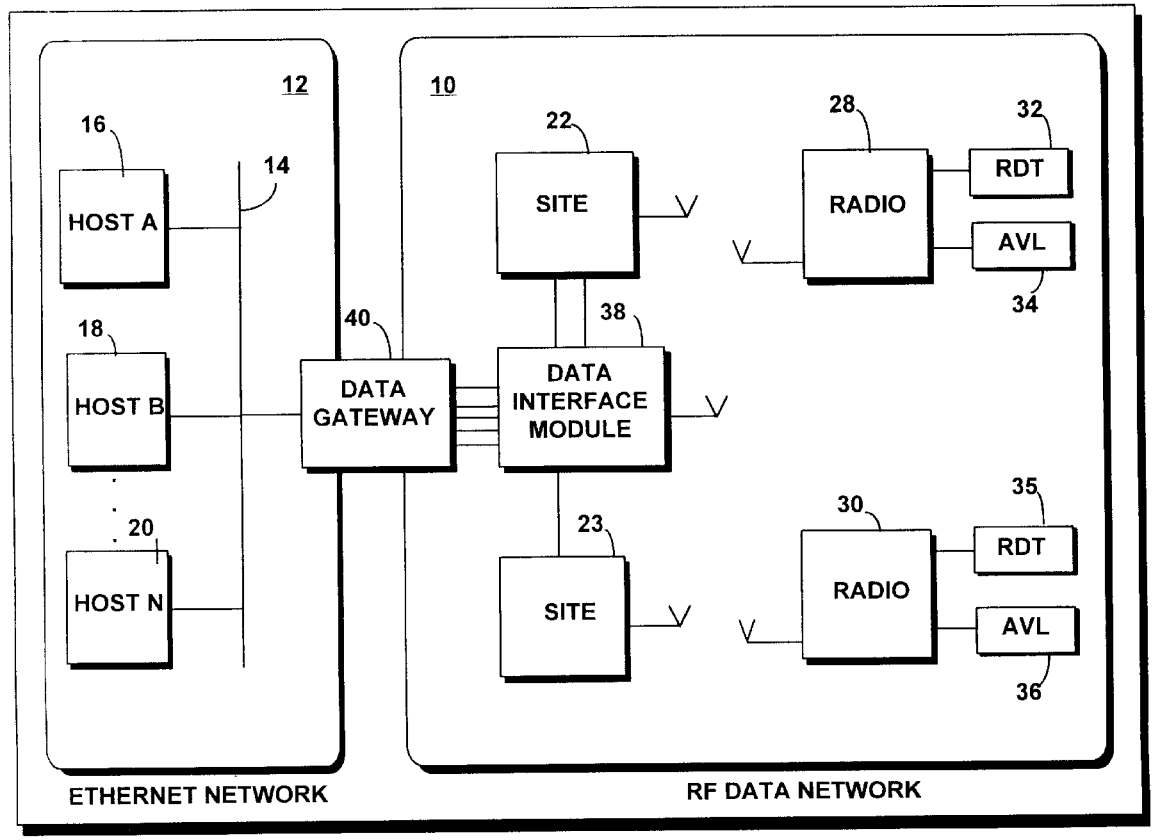
FIG. 3 is a function block diagram of an internetwork that includes an Ethernet network coupled to an RF data network through a gateway.

FIG. 3 shows two different types of networks including an Ethernet network 12 and an RF data network 10. No single type of network is best for all situations/applications. Ethernet networks perform well when used to connect computers physically located at the same location. However, an RF data network is best suited for mobile/portable radio data terminals (RDTs) where communications with other radio data terminals (and as described below, other host computers) are over a wireless, radio frequency (RF) physical communications medium. Host computers A, B, and N (16, 18, and 20) use Ethernet cable 14 as their physical communications medium and use Ethernet addresses and protocol to communicate. The radios 28 and 30, radio data terminals 32 and 35, and automatic vehicle locators (AVLs) 34 and 36 use radio frequencies as their physical communications medium and RF data network addresses and protocols to communicate with one or more sites 22, 23.

In the present invention, the radio itself is a potential data message end-receiver and data message originator. The radio also supports one or more other data message end-receivers and originators such as physical devices like the RDT and AVL, and "software" devices such as a text message feature, over the air radio programming, a software-configured radio group, a software-configured RDT group, etc. Hereafter, such hardware and software-based data end-receivers/originators including the radio are referred to generally as network layer data transceivers because they receive and originate messages at the network layer. For simplicity, however, the invention is described using the non-limiting example of a radio and radio data terminal (RDT) combination.

The Ethernet network 12 and the radio data network 10 are "internetworked" using a data gateway 40 and a data interface module 38. In general terms, data gateway 40 provides the interface for translating messages between both networks. The network layer, as shown in the OSI model in FIG. 1(a) and 1(b), is just above the data link layer and provides consistent addressing, protocol, and interface across the internet. Although the network layer addresses are consistent across the internet, they are converted to data link layer addresses specific to the network type to actually send data across a specific network. The data gateway 40 connects to the host computers 16, 18, and 20 on Ethernet network coaxial cable 14 using non-proprietary, standardized protocols such as TCP/IP. To interface with the RF data network, the data gateway 40 supports network driver software that functions at both the network and data link layers to make necessary protocol conversions.

Referring to FIG. 3, the following describes an example data flow from host computer 16 on the wireline Ethernet Network to the radio 28 on the RF Data Network. The host 16 sends a message to the data gateway 40. The data gateway 40 sends a call request to the data interface module 38. The data interface module 38 sends the call request to the site 22 where the radio 28 is located. The site 22 instructs the radio 28 over an RF control channel to which the radio is tuned to tune to an RF working channel to receive the message. The site 22 returns the RF working channel assignment to the data interface module 38. The data interface module 38 connects a data path between the data gateway 40 and the RF working channel and notifies the data gateway 40.

The data gateway 40 breaks the message down into packets and sends the first burst of packets to the site 22. The site 22 forwards the burst to the radio as over an RF channel it receives it. After the radio 28 receives the entire burst, it performs CRC-type error checking and if there are no errors, it sends an acknowledged message (ACK) at the data link layer back to the data gateway 40 (via the site 22), informing it of the packets that the radio correctly received. If necessary, the data gateway 40 sends another burst containing packets that the radio did not correctly receive and packets that the data gateway 40 has not previously sent. This process continues until the radio receives the entire message or until the data gateway 40 exhausts a preset number of retries. The radio processes the received data to determine whether the message is for it, and if not, routes the message without further processing to, for example, the RDT.

The following describes the data flow from the radio to host computer. The radio 28 informs the site 22 over the RF control channel that it has a message and requests an RF working channel. The site 22 assigns an available RF working channel and informs the radio 28. The site 22 sends the call assignment to the data interface module 38 which sends it on to the data gateway 40. The data interface module 38 sets up a data path between the data gateway 40 and the RF working channel. The radio 28 breaks the message down into packets and sends the first burst of packets to the site 22. The site 22 forwards the burst to the data gateway 40 as it receives it. After the data gateway 40 receives the entire burst, it sends an ACK back to the radio, informing it of the packets that the data gateway 40 correctly received. If necessary, the radio sends another burst containing packets that the data gateway 40 did not correctly receive and packets that the radio has not previously sent. This sequence continues until the data gateway 40 receives the entire message or until the radio exhausts its retries. If the data gateway 40 successfully received the message, the data gateway 40 sends the message to the host computer 16.

In communicating with the Ethernet network, the data link layer of the data gateway uses Ethernet II protocol also known as IEEE 802.3 DIX. The network layer uses the standard internet protocol (IP) described, for example, in the text by Douglas E. Comer entitled "Internetworking with TCP/IP, Vol. 1." Above network layer are "host-to-host"

conversations between a host computer (16–20) and a radio data terminal (30–36) which follow transport layer protocols. Any headers that they use above the network and transport layers are simply passed as data through the network and are not of particular interest to the present invention.

At the data link layer, the data gateway 40 and host computers 16–20 communicate using Ethernet addresses and address resolution protocol (ARP) to discover each other's Ethernet addresses based on their IP addresses. The network layer uses the IP address to decide where to route the message next. For messages originating from a host computer, the host computer addresses a radio (or group of radios) using a unique IP address assigned to each radio (and group). Normally, each host computer has a single entry added to its routing table instructing it to use the data gateway 40 as a next gateway for messages being sent to any destination on the RF data network 10. For messages from a radio to a host, the data gateway 40 receives the message, examines the IP address, and forwards the message on to the appropriate host computer.

FIG. 4 shows possible communication paths between the data gateway, radio, and radio data terminal, and the radio data terminal or radio and the data gateway. At the physical layer between the data gateway and the radio, the communications media is a radio frequency communications channel. Between the radio and the radio data terminal, the physical layer is an RS-232 serial link. At the data link layer, the "logical link" between the data gateway and the radio is a non-standard, hardened protocol designed specifically for limited bandwidth RF working channels assigned by sites 22 or 23 referred to as data channel signalling (DCS). The data link layer on the radio network uses a medium access control sublayer network driver, indicated in FIG. 4 generally as radio data interface (RDI), designed for personal computers running MS-DOS which converts between standard IP headers and RF data network layer headers. At the network layer, the standard IP network header protocol is modified/reduced to a radio network layer header as will be described in further detail below. As indicated generally in FIG. 4, a data packet from the data gateway can be destined for the radio or pass through the radio to the radio data terminal. Alternatively, data packets can be originated at both the radio data terminal and the radio and routed to the data gateway.

Figure 2B:
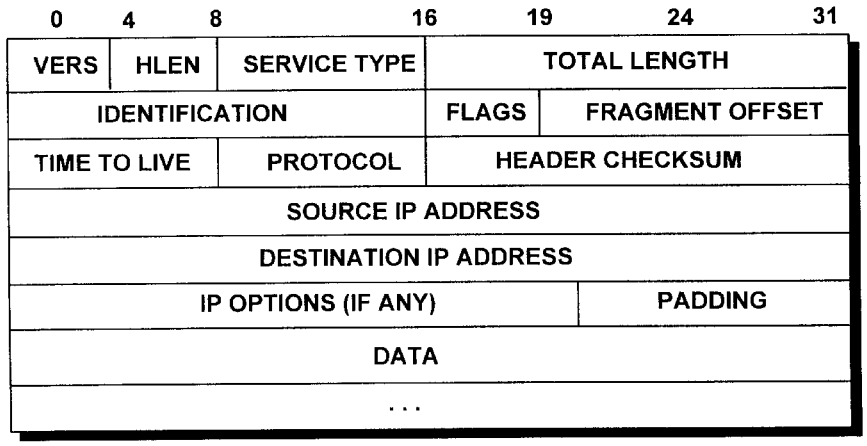
FIG. 2(b) is a diagrammatic view of a standard IP header.

For the network layer protocol, a standard Internet Protocol (IP) Headers is converted to a modified "long" Radio Network Layer (RNL) Header before datagrams are sent across the Radio Data Network. A long Radio Network Layer header is generated by omitting certain fields of information in the standard IP header and using just the version, unused, identification, more fragments, fragment offset, protocol, and extended address fields (see FIG. 2B). The long Radio Network Layer Header is shown in FIG. 5(*a*) and is stripped of unnecessary fields. The long RNL header is used for example for data communications between RDTs and the data gateway 40 over the RF link.

Shortening the network layer header to either the long or short radio network layer header reduces unnecessary overhead information on bandwidth limited RF channels and improves data transmission efficiency/speed over the RF Data Network. Moreover, the present invention permits a proprietary radio network layer protocol that is uniquely desirable in an RF environment to be used with and support standard IP features up through the network layer. As a result, standard computer communications protocols can be used within a radio data network while minimizing bandwidth use on the radio channel and permitting the use of a protocol optimized (hardened) for the RF environment.

The Short Radio Network Layer Header is shown in FIG. 5(*b*). Significantly, both the short and long radio network layer headers use the same first five fields. However, additional fields of the long RNL header including the identification (ID), more fragments (MF), and fragment offset fields are not used by the radio, and therefore, are not included in the short RNL header. The first fields (e.g., five fields) of the radio network layer header are fixed with the basic information needed to support network layer communications regardless of the ultimate length of the radio network layer header. Because the header including these five fields is short, it has minimal impact on existing radios and radio protocols. In addition, future changes to the network layer protocol that inevitably will occur are easily accommodated at the "back-end" of the header. In other words, additional fields may be added to the basic short radio network layer header fields to support additional network functions required by new network layer protocols. The immediate example of this is the extra three fields added to create the long network layer header shown in FIG. 5(*a*). With the "core" information at the front of the header, future enhancements and changes may be attached to the back end of the header without affecting the radio since the radio can ignore all of the fields in the RNL header after reading the last field in the short RNL header. In this way, the radio is not a bottleneck to future modifications and/or advances in data communication protocols.

The following is a description of the short RNL header fields:

Version=The version of the radio network layer header used to create the datagram.

U=Unused Bits available for future use.

RNLH Size=Radio Network Layer Header Size indicates whether the RNL header is long or short.

Extended address=For messages to the radio network, this field defines the Source IP Address; for messages from the radio network, this field defines the Destination IP Address.

Transport layer protocol=This field is passed through as defined by the Standard IP Header.

The long RNL header includes these additional fields:

IDENTIFICATION=Number that uniquely defines all of the fragments of the same message from the same source.

MF=More Fragments. This bit is set if there are more fragments coming in the current message.

Fragment offset=This field tells where this fragment belongs in the current message. When a message is fragmented, each fragment except the last one must be a multiple of 8 bytes long. The fragment offset is multiplied by 8 to determine the byte offset. A maximum message size may be for example 64K bytes.

For RDT communications, if the IP datagram includes 512 bytes or less of data, the More Fragments (MF) and Fragment Offset fields are copied from the IP Header. For RDT communications with more than 512 bytes, the data gateway further fragments the message into bursts of 512 bytes or less. Where the radio is the originating or end destination device, the radio does not send or receive messages longer than 512 bytes and therefore does not further fragment messages. When sending to a radio as the end device, the data gateway 40 may combine fragmented messages but imposes a 512 byte limit on the combined message. In this way, the MF and fragment offset fields are eliminated for radio originated/end messages which simplifies radio programming, i.e, the radio code is not required to provide fragmentation support. For datagrams from the data gateway 40, the Extended Address is the Source IP Address. For datagrams from a Radio Data Terminal (RDT) or a radio as on a message originator, the Extended Address is the Destination IP Address.

Short and Long Radio Network Layer Headers are converted in the data gateway 40 to IP headers after datagrams are sent across the Radio Network. The RNL Short Header is transformed into an IP Header from the following information:

Static Fields used in all IP Headers:

| Static Fields used in all IP Headers: | | | |
|---|---|---|---|
| VERSION | 0 | U bit (unused) | 0 |
| HEADER LENGTH | 5 | TIME TO LIVE | 255 |
| SERVICE TYPE | 0 | IP OPTIONS | Not Used |
| DF bit | 0 | PADDING | Not Used |

Configured Information: The IP Address of the Radio.

Fields gathered from the Radio Network Data Link Layer: Total Length is calculated from the data link layer total length plus 10 bytes. The 10 bytes correspond to extra data added for the conversion from the radio network layer header to the IP header.

Fields taken from the Short Radio Network Layer Header: Unused and Protocol.

Calculated Field: Header Checksum

The Vers field is set to the current IP version. Because radios do not send or receive fragmented messages, the Fragment Offset and MF fields are set to zero. The Identification field is set by the data gateway to a unique value, e.g., by incrementing a counter.

When the data gateway 40 receives a datagram from the radio network, the data gateway converts the Data Link Layer Address to the Source IP Address using configuration information in the data gateway. The data gateway uses the Extended Address in the RNL Header as the Destination IP Address. When the radio or RDT receives a datagram from the data gateway, it uses the Extended Address in the long Radio Network Layer Header as the Source IP Address. The radio or RDT use configuration information stored in the radio or RDT for the Destination IP Address if necessary. Since terminating devices in the network must be configured with an IP address, the network layer on those devices inserts its own IP address as the destination IP address. This is the case simply because the radio or RDT is a "terminating" network device rather than an intermediate network device.

Figure 6:
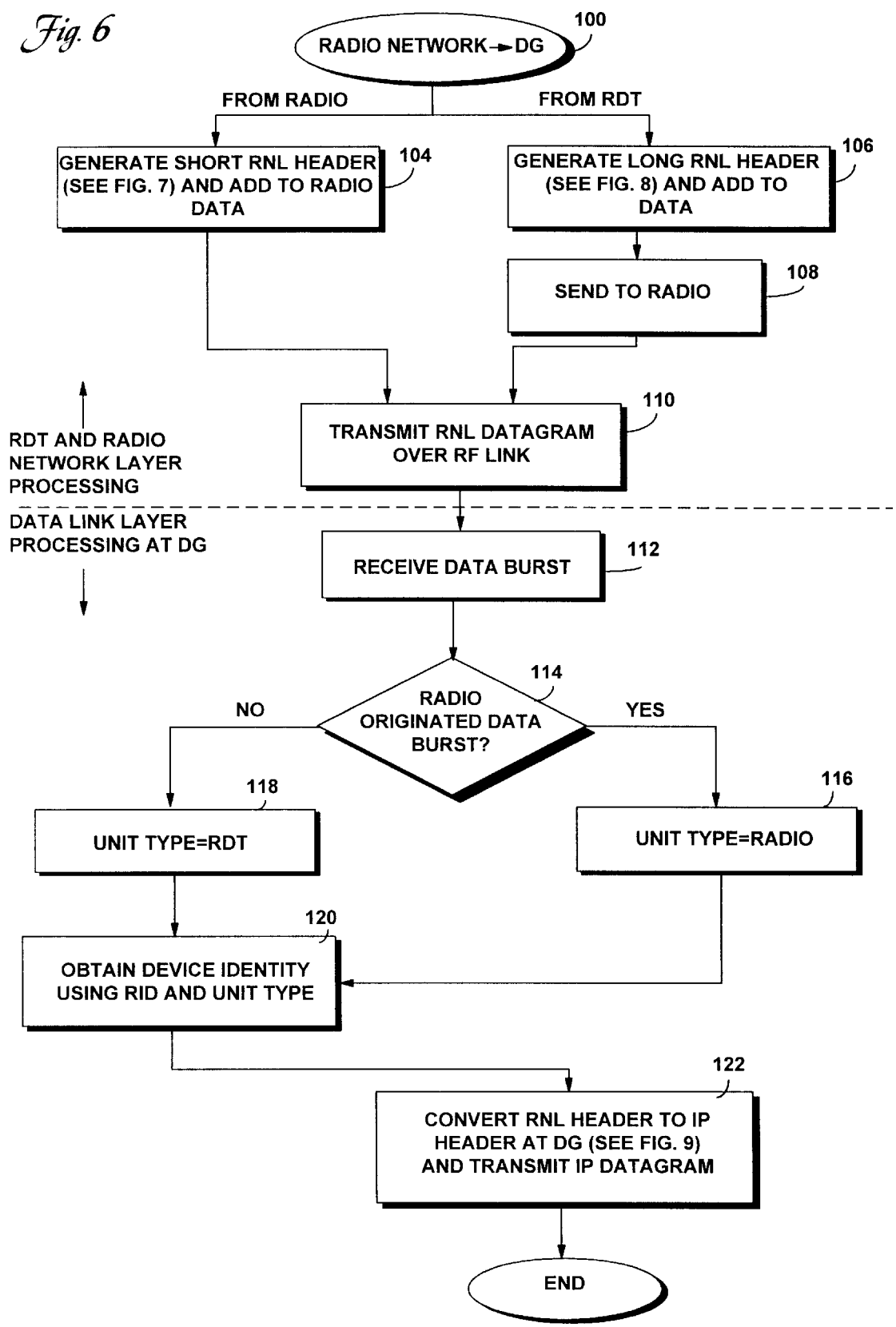
FIG. 6 is a flowchart diagram illustrating procedures performed at the network and data link layer protocols for data transmissions originating from either the radio or some other device associated with the radio destined for a wireline data gateway.

FIG. 6 is a flowchart which illustrates procedures at the network and data link layer protocols for data transmissions originating from network layer data transceivers to the data gateway (block 100). For purposes of simplicity in the following flowcharts shown in FIGS. 6–12, only the radio and RDT are used as network layer data transceivers. However, these procedures apply equally as well to other network layer data transceivers described above. Blocks 102–110 describe network layer processing at the RDT and/or radio. A logical decision is made whether the data originates from the radio or the RDT. If the data originates from the radio, the radio generates a short radio network layer header in accordance with the procedures outlined in the flowchart in FIG. 7 and adds that short radio network layer header to each datagram to be transmitted (block 104). For data originating from the RDT, the RDT generates a long radio network layer header as outlined in the flowchart in FIG. 8 and adds that long radio network layer header to each datagram to be transmitted (block 106). The RDT then transmits the datagram to the radio (block 108) over the serial link using a radio data interface (RDI) or equivalent protocol. The radio then transmits the radio network layer datagram over the RF link (block 110) (DCS) using the data channel signalling (DCS) protocol.

Blocks 112–122 describe data link layer processing at the data gateway. Since the present invention envisions more than one type of network layer data transceiver attached or associated with one radio (in the flowchart examples there are only two—the radio and the RDT), the data gateway maintains a data transceiver configuration table that specifies the configuration of those transceivers in the RF network. Over the radio network, messages must be routed to one radio ID corresponding to that radio. Nevertheless, each network layer data transceiver including the radio needs a separate network IP address for routing messages at the network level. Thus, for each unit type (i.e., each different network layer data transceiver) associated with the single radio and therefore a single radio ID, the data transceiver configuration table stores the unit type and radio ID along with a unique IP address and the version of the network layer protocol being used by that data transceiver. Using the radio ID and unit type, the data gateway obtains the unique IP address of the data transceiver which originated the data message (block 120).

Data bursts (or frames) are received at the data gateway (block 112), and the data gateway determines whether the radio originated the data bursts (decision block 114). If the RDT originated the data, the unit type is equated to an RDT (block 118). Otherwise, the unit type is equated to a radio (block 116). The IP address information for that data transceiver is obtained by the data gateway accessing the data transceiver configuration table with the radio ID and unit type (block 120). The data gateway then converts the radio network layer header to the IP header in accordance with the steps outlined in the flowchart in FIG. 9 and transmits the IP datagram on the Ethernet Network 12 connected to the data gateway (block 122).

FIG. 7 is a flowchart diagram illustrating example procedures for generating a short radio network layer header (block 130). The version bits are set to the version of the radio network layer protocol in use by the radio, and the unused bits are set to zero (block 132). The network layer header size is set by the radio to indicate that it is a short radio network layer header (block 134). The extended address field in the header is set by the radio as the destination IP address (block 136). Radios may be programmed with the destination IP address or the host IP application sends its IP address to the radio via some upper layer (e.g., application layer) of the OSI model. Alternatively, the radio waits for a host originated message before sending any messages to that host. The extended address field for a radio destined message from the host contains the host's IP address. The transport layer protocol is set to that which is currently in use between the host and radio applications (block 138).

FIG. 8 is a flowchart diagram illustrating example procedures for generating a long radio network layer header (block 140). The version bits are set to the version of the radio network layer protocol currently in use by the RDT, and the unused bits are set to zero (block 142). In block 144, the network layer header size bits are set to indicate a long radio network layer header (block 144). The identification, MF bit, fragment offset bit, and protocol fields are copied from the IP header into the long radio network layer header (block 146). The destination IP address is copied from the IP header to the extended address of the long radio network header (block 146).

Figure 9:
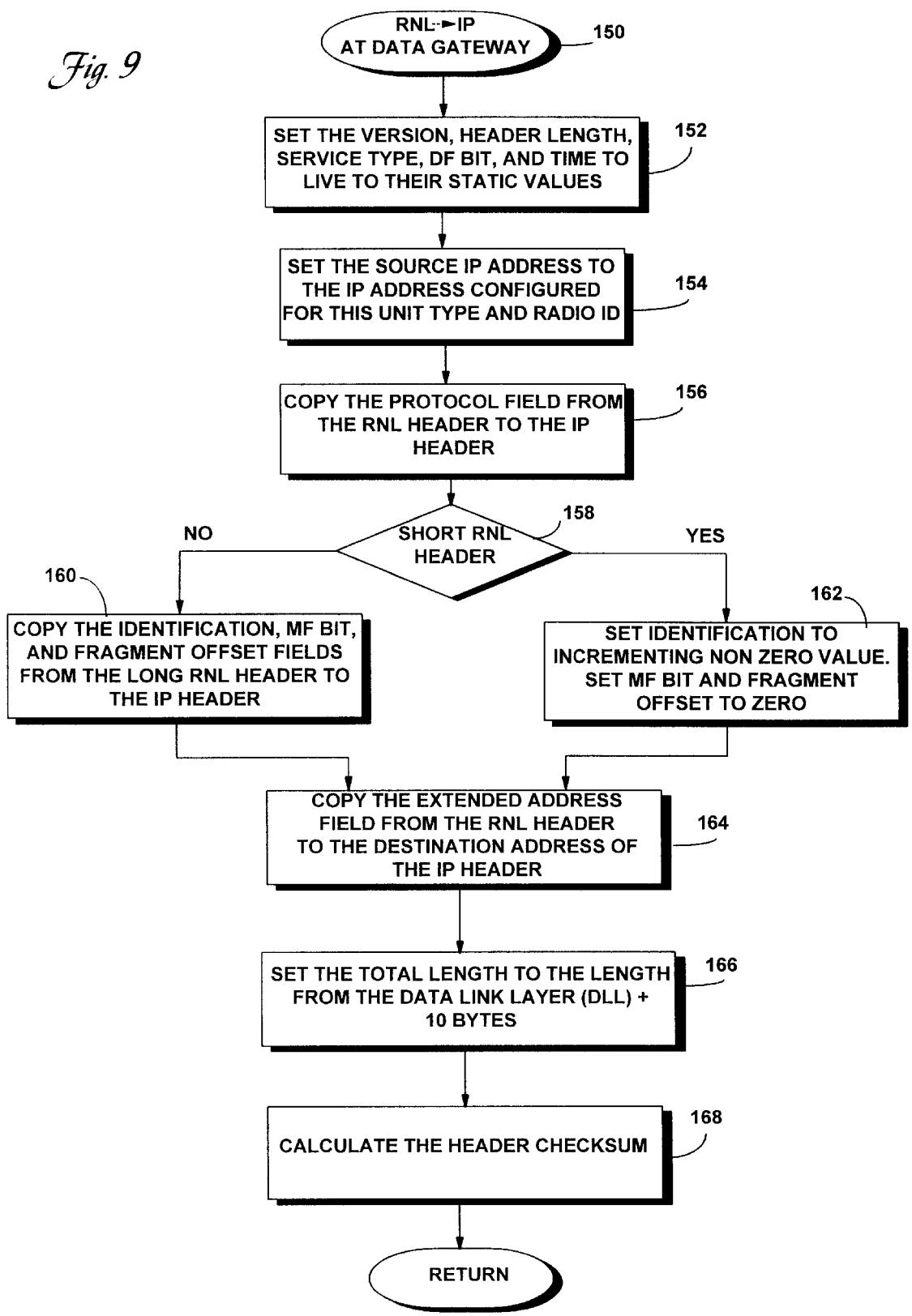
FIG. 9 is a flowchart diagram illustrating the procedures for converting a radio network layer header to an IP packet header at the data gateway.

FIG. 9 is a flowchart diagram illustrating example procedures for converting a radio network layer header to an IP packet header of the data gateway (block 150). The data gateway sets the version, header length, service type, DF (Don't Fragment) bit, and time to live fields to their known static values (block 152). The data gateway sets the source IP address to the IP address configured in the data transceiver configuration table described above for this unit-type and radio/logical ID (block 154). The protocol field is copied from the RNL header into the IP header (block 156). A decision is made in block 158 whether the RNL header is short or long. If it is long, the data gateway copies the identification, MF bit, and fragment offset fields from the long RNL header into the IP header (block 160). Otherwise, the data gateway sets the identification to an incrementing, non-zero value. The MF bit and fragment offset fields are set to zero because the radio is not permitted to send fragmented messages (block 162). The data gateway then copies the extended address field from the radio network layer header (included in both the short and long headers) to the destination address of the IP header (block 164). The total length is set based on the length already present in the data link layer plus 10 bytes (block 166). The header checks on this calculation and then inserts it into the reconstructed IP header (block 168).

Figure 10:
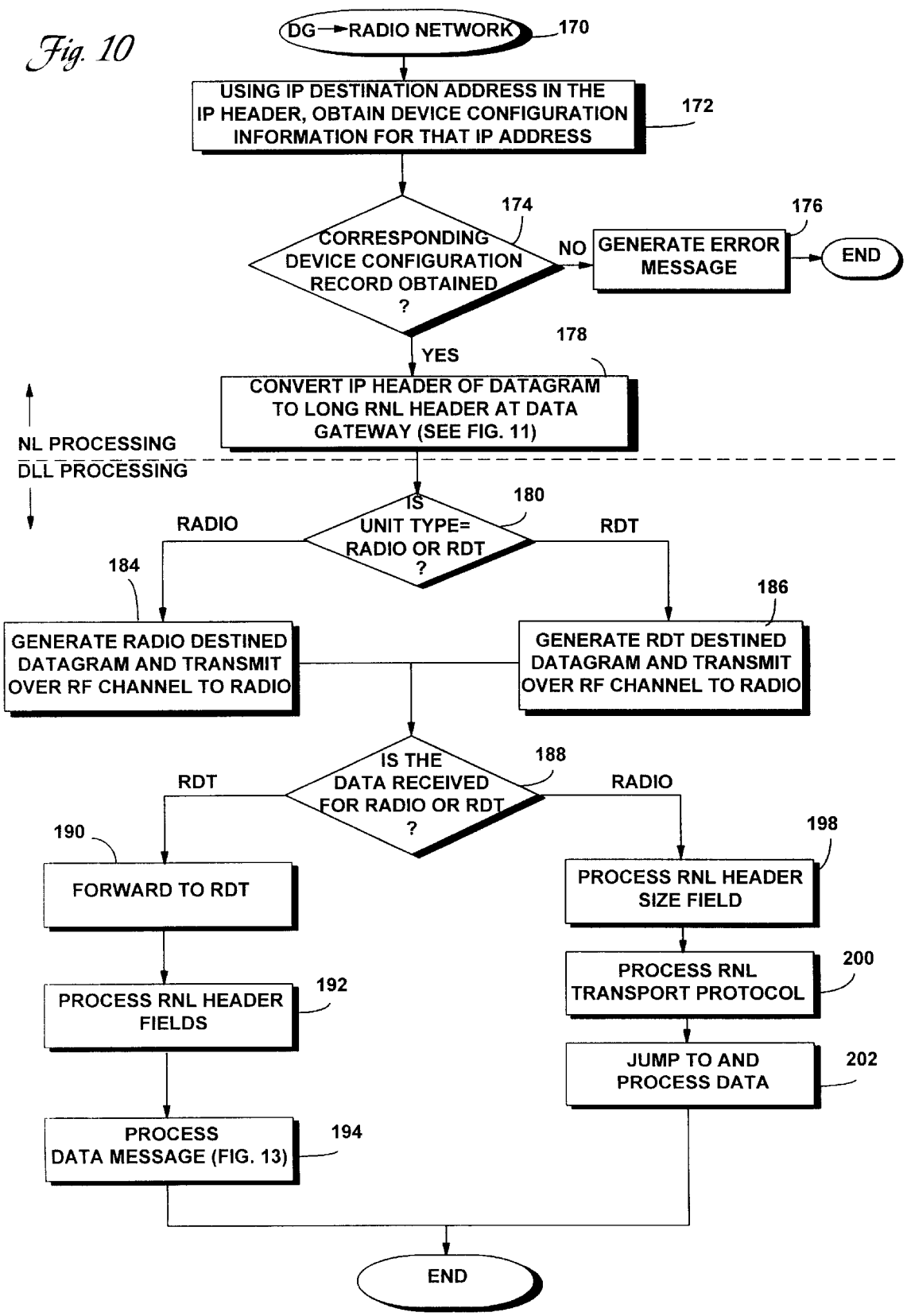
FIG. 10 is a flowchart diagram illustrating performed transmissions procedures at the network and data link layer levels for data transmissions originating from the data gateway destined for either the radio or some other device associated with the radio.

The flowchart in FIG. 10 illustrates example procedures performed at the network and data link layer levels for data transmissions originating from the data gateway destined for either the radio or some other device associated with the radio (block 170). Using the IP destination address in the IP header of the datagram being sent from the data gateway, the data gateway accesses the data transceiver configuration table to obtain the appropriate configuration information for that IP address, e.g., the corresponding radio or logic ID needed to transmit messages over the radio network, the unit type, and the network layer version (if any). If a corresponding device configuration record is not obtained for that IP address (block 174), an error message is generated (block 176). Otherwise, control proceeds to block 178 where the data gateway converts the IP header of the datagram to a long radio network layer header in accordance with the procedures outlined in FIG. 11. The procedures performed in blocks 172–178 correspond to the network layer processing at the data gateway.

The procedures corresponding to blocks 180–202 correspond to data link layer processing performed by the data gateway and by the radio/radio data terminal. From the data transceiver configuration record previously obtained in block 174, the data gateway determines whether the unit type for the data message to be transmitted corresponds to the radio itself or to the RDT associated with the radio (block 180). If the unit type corresponds to the radio, the datagram is routed by data gateway 40, data interface module 38, and the appropriate site 22, 23 for transmission over the appropriate RF channel to the radio (block 184). If the unit type corresponds to the RDT, the datagram is routed to the appropriate site and transmitted over the assigned RF channel to the radio (block 186). A decision is then made by the radio in block 188 whether the data received is for the radio or for the RDT which the radio can determine by processing the RNLH size field of the radio network layer header attached to the received data. If the data is for the RDT, the radio forwards the data to the RDT (block 190), and the RDT extracts the RNL header information (block 192) including the RNL transport layer protocol to be used for further communications processing by the RDT. The RDT then processes the data message in accordance with the procedures outlined in FIG. 12 (block 194). If the data received is for the radio, the radio processes the RNL header size field (block 198) and the RNL transport protocol (block 200). Since the radio now knows the message is intended for the radio, it "jumps" over any extra fields in the header and directly processes the data (block 202). This is advantageous because the data gateway uniformly formats all messages intended for data transceivers as long radio network layer messages, and the radio determines whether the message is for it by processing just a few of the first fields in the header or passes the message along to the intended data transceiver associated with that radio. A further advantage is that the radio programming code is simplified by not having to support fragmentation and re-assembly of datagrams.

Figure 11:
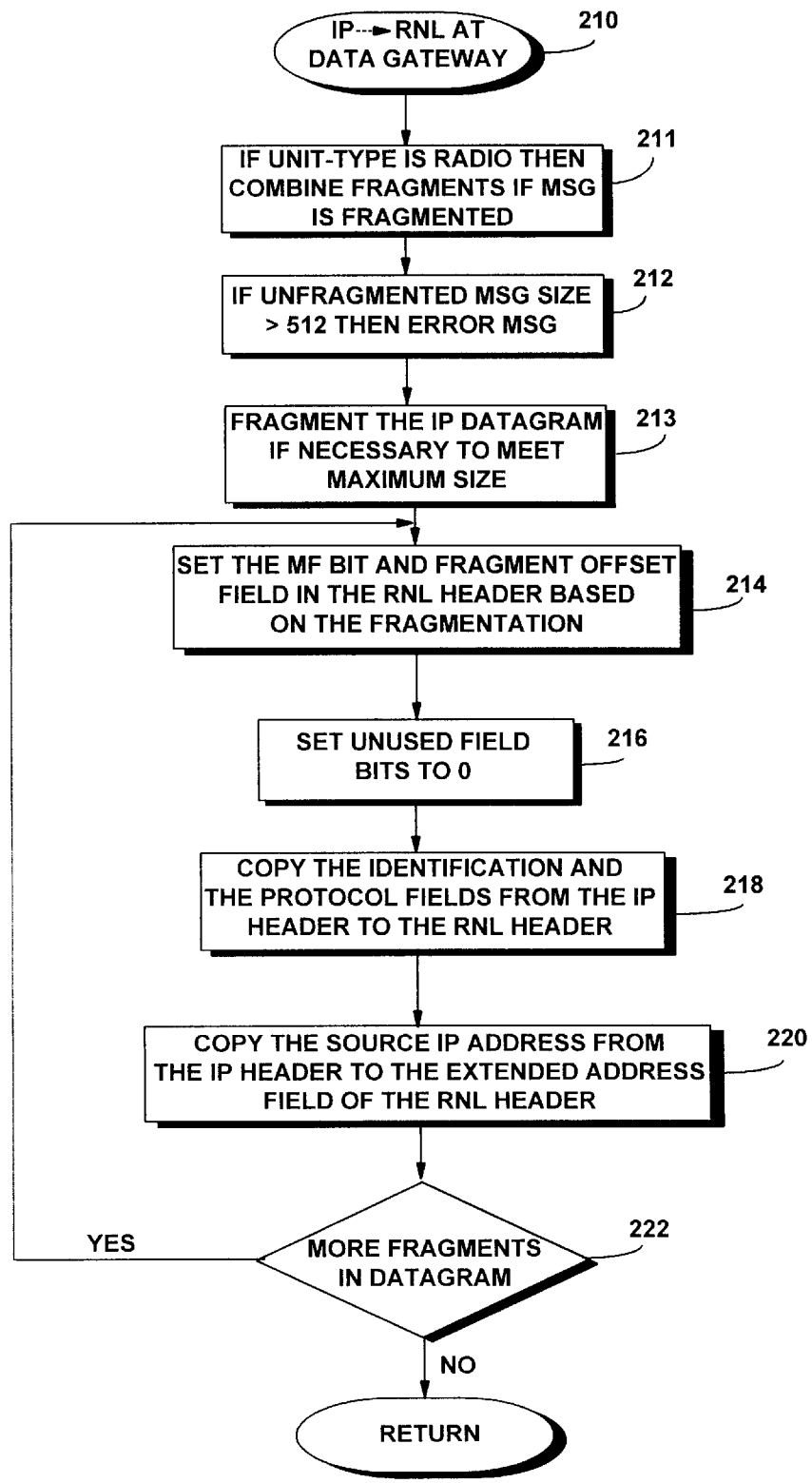
FIG. 11 is a flowchart diagram illustrating the procedures for converting an IP packet header to a radio network layer header at the data gateway.

FIG. 11 is a flowchart diagram illustrating the procedures for converting an IP packet header to a radio network layer header at the data gateway (block 210). If the unit type is a radio, the data gateway 40 combines fragments of the message if necessary (block 211). Further, if length of combined message exceeds the data link layer maximum size, then an error message is generated (block 212). The data gateway fragments the datagram if necessary to meet maximum size requirements (block 213). The MF bit and fragment offset field bits in the RNL header are set based on the fragmentation carried out in block 212 (block 214). Unused bits are set to zero (block 216), and the data gateway copies the identification and protocol fields from the IP header into the RNL header (block 218). The source IP address is copied directly from the IP header into the extended address field of the RNL header (block 210). If there are more fragments in the datagram (block 222), control returns to block 214.

FIG. 12 is a flowchart diagram illustrating the procedures for converting a radio network layer header to an IP header at the radio data terminal. The unused bit field is set to zero (block 232), and the version, header length, service type, DF bit, and time to live fields are set to their static values which are stored in the RDT (block 234). Next, the destination IP address is set to the IP address configured for this particular RDT (block 236). The identification, MF bit, fragment offset, and protocol fields from the RNL header are copied into the reconstructed IP header (block 238). The extended address from the RNL is copied into the source address field of the reconstructed IP header (block 240). The total length field of the IP header is set based on the length already present in the data layer plus 10 bytes (block 242). The header checks on and is calculated and inserted into the reconstructed IP header (block 244).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a data communications system where data messages having a header and an associated data portion are communicated between entities that interact over a network using a standard internetwork protocol (IP) and where the network includes a radio link connected to a radio associated with one or more radio entities, a method comprising:

formatting a data message using one of a first and second radio network layer (RNL) header formats, both of the first and second RNL header formats supporting the standard internetwork protocol but differing from a standard IP header in that predetermined bits are omitted from the standard IP header attached to each data messages, where the first RNL header format is shorter than the second RNL header format;

determining whether the data message is originated by the radio or by one of the radio entities associated with the radio;

where if the data message is originated by the radio, formatting the data message using the first RNL header format;

if the data message is originated by the one radio entity, formatting the data message using the second RNL header format; and transmitting the formatted data message over the radio link.

2. The method in claim 1, wherein the first RNL header format includes fewer bits than the second RNL header format.

3. The method in claim 1, wherein the first RNL header format includes fewer bit fields than the second RNL header format.

4. The method in claim 3, wherein the initial bit fields in the first and second RNL headers are the same.

5. The method in claim 1, wherein if the data message is destined for either the radio or the one radio entity, the data message is formatted using the second RNL header format.

6. In a data communications system where data messages having a header and an associated data portion are communicated between entities that interact over a network using a standard internetwork protocol (IP) and where the network includes a radio link connected to a radio associated with one or more radio entities, a method comprising:

formatting a data message using one of a first and second radio network layer (RNL) header formats, both of the first and second RNL header formats supporting the standard internetwork protocol but differing from a standard IP header in that predetermined bits are omitted from the standard IP header attached to each data message, the first and second RNL headers including a RNL size field that indicates whether the header is the first or the second RNL header; and transmitting the formatted data message over the radio link, wherein the radio processes the RNL size field of a data message received over the radio link and passes the data message onto the one radio entity if the RNL size field indicates the second RNL header.

7. The method in claim 1, wherein a data gateway receives radio transmissions over the radio link and adds one or more bit fields to the RNL header of a data message received over the radio link to convert that RNL header into a corresponding standard IP header before further transmitting the received data message over the network.

8. In a data communications system where data messages having a header and an associated data portion are communicated between entities that interact over a network using a standard internetwork protocol (IP) and where the network includes a radio link connected to a radio associated with one or more radio entities, a method comprising:

formatting a data message using one of a first and second radio network layer (RNL) header formats, both of the first and second RNL header formats supporting the standard internetwork protocol but differing from a standard IP header in that predetermined bits are omitted from the standard IP header attached to each data message; and transmitting the formatted data message over the radio link, wherein a data gateway receives radio transmissions over the radio link and adds a greater number of bits to the first RNL header of a data message received from the radio link to convert the first RNL header into a corresponding standard IP header before transmitting the other message over the network than for a data message received with the second RNL header.

9. In a data communications system where data messages having a header and an associated data portion are communicated between entities that interact over a network using a standard internetwork protocol (IP) and where the network includes a radio link connected to a radio associated with one or more radio entities, a method comprising:

formatting a data message using one of a first and second radio network layer (RNL) header formats, both of the first and second RNL header formats supporting the standard internetwork protocol but differing from a standard IP header in that predetermined bits are omitted from the standard IP header attached to each data message; and transmitting the formatted data message over the radio link, wherein a data gateway receives radio transmissions over the radio link and determines an IP address for a data message received over the radio link based on an identification number associated with the radio and a type of the radio entity originating the data message.

10. A data communications system for transmitting data messages, each data message including a header and associated data, comprising:

first and second communications networks connected by a radio link, the first network using a standard internetwork protocol (IP);

plural computing devices included in the first network;

a data gateway connected to the first network and interfacing with one end of the radio link; and a radio coupled to a radio associated device included in the second network, the radio connected at an opposite end of the radio link and a radio communications protocol being used for data communications over the radio link, wherein for data messages from the first network intended either for the radio or for the radio associated device, the data gateway removes a first number of bit fields of a standard IP header for each data message to obtain a first modified network header, for data messages originated from the radio intended for the first network, the radio attaches to each data message a second number of bit fields to obtain a second modified network header, the second number being smaller than the first number, and for data messages originated from the radio associated device intended for the first network, the radio associated device attaches to each message the first modified header before passing the message and the first modified header to the radio for transmission to the data gateway.

11. The system in claim 10, wherein the first network is a wireline network including a plurality of computers.

12. The system in claim 10, wherein the initial bit fields in the first and second modified network headers are the same.

13. The system in claim 10, wherein the second modified network header includes a minimal amount of information to support network communications according to the standard IP.

14. In a communications system permitting data communications between a first data processor associated with a computer communications network and a radio associated with a radio communications network and between the first data processor and a data processing terminal connected to the radio to transfer packets of information, each packet including a header and a message, a method comprising the steps of:

- determining whether a message originates from the radio or the data processing terminal connected to the radio;
- if the message originates from the radio, generating a short radio network header, adding the short radio network header to the message thereby generating a radio-originated datagram, and transmitting the radio-originated datagram over a radio link; and
- if the message originates from the data processing terminal connected to the radio, generating a long radio network header longer than the short radio network header, adding the long radio network header to the message, thereby generating a terminal-originated datagram, and transmitting the terminal-originated datagram over the radio link.

15. The method in claim 14, further comprising:

- adding a first number of fields to the radio-originated datagram at a data gateway connected to the computer communications network before sending the radio-originated datagram over the computer communications network, and
- adding a second number of fields less than the first number to the terminal-originated datagram at the data gateway before sending the terminal-originated datagram over the computer communications network.

16. The method of claim 14, further comprising the steps of:

- irrespective of whether a message is finally destined for and to terminate at the radio or the data processing terminal connected to the radio, generating at the data gateway a long radio network header, adding the long header to the message, and transmitting the datagram over the radio link.

* * * * *